United States Patent [19]

DeCasper

[11] Patent Number: 4,646,409

[45] Date of Patent: Mar. 3, 1987

[54] CONTAINER LID SEATING TOOL

[76] Inventor: Wayne DeCasper, 18311 Pepper St., Castro Valley, Calif. 94546

[21] Appl. No.: 814,888

[22] Filed: Dec. 30, 1985

[51] Int. Cl.[4] .............................................. B23P 11/00

[52] U.S. Cl. ...................................... 29/243.5; 29/268

[58] Field of Search .......................... 72/211, 210, 196; 29/268, 243.5; 140/106

[56] References Cited

U.S. PATENT DOCUMENTS

| | | | |
|---|---|---|---|
| 501,644 | 7/1893 | Blumer | 72/211 |
| 524,400 | 8/1894 | Rinman | 72/211 |
| 733,131 | 7/1903 | Blumer | 72/211 |
| 837,783 | 12/1906 | Blumer | 72/211 |
| 1,914,738 | 6/1933 | Elster | 30/426 |
| 2,235,616 | 3/1941 | Ice | 72/211 |
| 2,471,445 | 5/1949 | Nicholas | 72/211 |
| 2,543,259 | 2/1951 | Robbins | 72/211 |
| 3,129,509 | 4/1964 | McLean | 30/427 |
| 3,680,346 | 8/1972 | Wilcox | 72/211 |
| 4,301,595 | 11/1981 | Franek | 30/427 |
| 4,472,867 | 9/1984 | Wivinis | 29/243.5 |

*Primary Examiner*—Robert C. Watson
*Attorney, Agent, or Firm*—Harris Zimmerman; Howard Cohen

[57] ABSTRACT

A compact, economical and easily operated hand tool facilitates reclosing and resealing of paint cans or similar containers that have a frictionally engaged lid and which contain materials that may not be completely used immediately after the initial opening of the can. A pair of handle members are grasped by one hand of the operator and positioned adjacent the rim of the can during use. A drive wheel on one handle member is manually rotated with the other hand and rides around the underside of the rim of the can while a cooperating broader rotatable drum on the other handle member applies seating pressure to successive portions of the lid of the can. Substantially uniform pressure may be applied to all portions of the edge of the lid to effect a complete and reliable sealing of the can.

10 Claims, 6 Drawing Figures

FIG _ 1
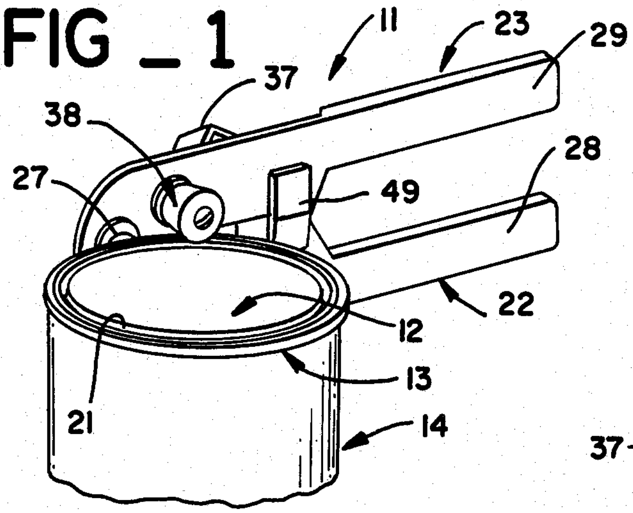
FIG _ 2
(PRIOR ART)
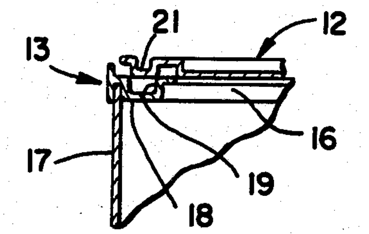
FIG _ 6
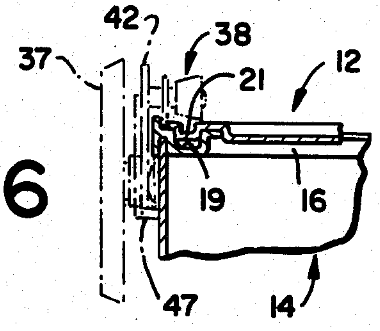
FIG _ 3
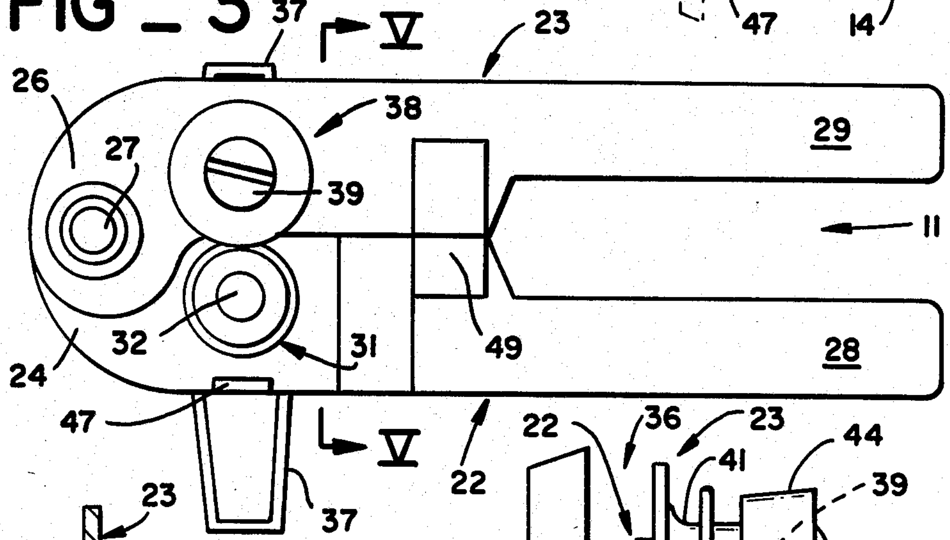
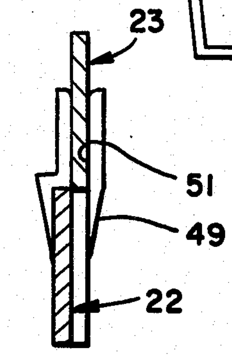
FIG _ 5
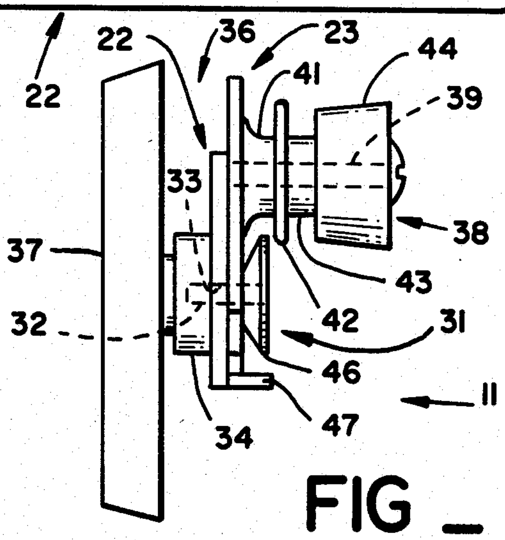
FIG _ 4

CONTAINER LID SEATING TOOL

TECHNICAL FIELD

This invention relates to apparatus for closing and sealing cans or similar containers and more particularly to a tool particularly adapted for reclosing paint containers or the like of the kind having a frictionally engaged lid.

BACKGROUND OF THE INVENTION

A variety of commercial products require a can or similar container that can be reclosed and resealed one or more times after being initially opened.

Cans for paint or similar products are usually of the above described type. Very often only a portion of the contents of the can is used immediately after the can is first opened. It then becomes necessary to re-engage the lid on the container to prevent hardening or other deterioration of the remaining contents from exposure to the atmosphere.

A common form of can or container for materials of the above discussed kind has an open upper end defined by rim structure that is of slightly greater diameter than the adjacent portions of the can or container. The lid or closure for the container has a downwardly extending corrugation around the edge that is proportioned to fit within the container rim and to be slightly compressed in the process so that the lid is held at the container opening by frictional resistance to removal. In a common form of can or container of this type, the corrugation around the edge of the lid is fitted into a groove in the container rim.

Closing of paint cans or the like of the above described type requires application of a significant amount of force to the edge of the lid as it is being engaged on the container. Further, such force must be exerted at least somewhat evenly at successive points around the periphery of the lid to assure that it will be fully engaged and will fully seal the container. Specialized can closing mechanism may be used at the factory for this purpose but such apparatus is too bulky and costly to be employed elsewhere by many persons who may need to reclose such containers.

A procedure commonly used by such persons to reclose paint containers or the like is to repetitively tap on successive portions of the edge of the lid with a rubber mallet or some other object that may be pressed into service for the purpose. It is difficult to distribute the force evenly around the edge of the lid by this technique. Portions of the lid which have already been engaged may be disengaged or slightly unseated by subsequent tapping on the opposite portion. This prolongs the closing operation or, if undetected, may cause subsequent spoiling of spilling or the contents of the container. Deformation of the edge of the lid is also a common occurence.

Tools designed for opening cans or the like are not adaptable to reclosing operations of the above described kind. A common form of can opener, for example, has a pair of handle members pivoted together at one end and shaped to be grasped in one hand of the operator. A drive wheel on one handle member rides against the underside of the can rim and is turned with a crank grasped by the other hand of the operator. A sharp cutting wheel on the other handle member is forced through the can lid by squeezing the two handles together and then cuts the lid from the can as the crank is turned. It is possible to apply an even cutting force to successive portions of the lid but such devices destroy the lid and thus are not suitable for reclosing and resealing paint containers or the like.

It would be advantageous if a compact and economical tool were available which would enable application of an even closing force around the edge of resealable containers in a rapid and reliable manner.

The present invention is directed to overcoming one or more of the problems discussed above.

SUMMARY OF THE INVENTION

In one aspect, the present invention provides a tool for seating a lid at the opening of a container which opening is defined by a container rim of greater diameter than the adjacent portion of the container, the lid having a peripheral portion shaped to fit within the container rim and to be frictionally engaged by the rim. The tool includes first and second arm members which are pivotably coupled together and which have handle portions proportioned to be jointly grasped by one hand of an operator, a rotatable drive wheel carried by the first arm member in position to bear against the underside of the container rim when the tool is held adjacent the container rim, and drive means for enabling rotation of the drive wheel to bring the drive wheel into contact with successive portions of the underside of the container rim. The tool further includes a rotatable drum carried on the second arm member in position to exert pressure against the peripheral portion of the lid in cooperation with the drive wheel when the handle portions of the arm members are forced towards each other by the operator's hand, the rotatable drum having a greater length in the axial direction than the drive wheel.

In another more specific aspect, the invention provides a tool for seating a frictionally engaged lid at the opening of a container which has a rim around the opening that is of slightly greater diameter than the adjacent portion of the body of the container, the tool having first and second arm members with adjacent first ends and with handle portions at the opposite ends and having pivot means for coupling the arm members at the first ends while enabling the handle portions to be moved towards each other and away from each other. A rotatable drive wheel is journalled to the first arm member between the pivot means and the handle portion and is positioned for contact with the underside of the container rim when the tool is held adjacent the rim. The tool further includes means for manually turning the rotatable drive wheel to bring the drive wheel into contact with successive portions of the underside of the rim and has a rotatable drum journalled to the second arm member between the pivot means and the handle portion in position to contact the peripheral region of the lid when the drive wheel is in contact with the underside of the rim. The drum has a length along its axis of rotation that is greater than the length of the drive wheel along its own axis of rotation and the drum has a diameter which increases outwardly from the second arm member.

The tool enables progressive engagement of successive portions of a frictionally engagable lid with successive portions of the rim of a container in a very convenient and reliable manner and without damage to the lid or container. The tool provides for application of a more uniform sealing force to successive portions of the lid than is generally realized by tapping on the lid with a mallet or other object. The tool can also avoid unseating of a previously engaged portion of the lid by sealing force subsequently applied to the opposite portion of the lid.

BRIEF DESCRIPTION OF THE DRAWINGS

FIG. 1 is a perspective view of a container lid seating tool is accordance with a preferred embodiment of the invention shown in the operating position adjacent a container.

FIG. 2 is an elevational section view of a portion of a container and the container lid of a type which may be closed and sealed with the tool of FIG. 1.

FIG. 3 is a side view of the container lid seating tool of FIG. 1.

FIG. 4 is a front end view of the container lid seating tool of the preceding figures.

FIG. 5 is a cross section view of the container lid seating tool taken along line V—V of FIG. 3.

FIG. 6 is an elevation view of the container lid seating tool and portions of a container and container lid illustrating the operation of the tool during sealing of a container.

DETAILED DESCRIPTION OF A PREFERRED EMBODIMENT

Referring initially to FIG. 1 of the drawings, a container lid seating tool 11 in accordance with this example of the invention is designed for facilitating engagement of a lid 12 with the rim 13 of a can 14 or other container of the type in which the lid is retained in the closed position by a frictional engagement with the container rim.

Referring now to FIG. 2, containers 14 of the type with which the tool 11 may be used may have a variety of configurations and sizes but in general have an opening 16 defined by the rim 13 and a body 17 in which materials are contained. The rim 13 is of slightly greater outside diameter than at least the adjacent portion of the container body 17. In the more common forms of containers 14 of this type, the rim 13 is formed with a downwardly directed corrugation 18 that forms a groove 19 that extends around the opening 16 within the rim. Groove 19 is proportioned to receive another downwardly directed corrugation 21 formed on the periphery of lid 12 and which extends around the edge region of the lid.

The lid corrugation 21 may be slightly thicker than groove 19 so that some slight resilient compression of that corrugation and/or distension of the rim corrugation 18 occurs as the lid 12 is engaged on the container 14. Alternately, the lid corrugation 21 or the like may simply be formed with a slightly greater outside diameter than the groove. Some other container constructions may not have a groove 19 in the rim in which case the lid corrugation 21 or the like is proportioned to fit within the container opening 16 itself but has a slightly greater diameter. In any case, the elements are proportioned so that some slight distortion, resisted by resiliency, occurs as the lid 12 is fitted on the container 14. This creates frictional forces which function to retain the lid 12 on the container 14 and also to assure sealing at the juncture. It also makes it necessary to exert a substantial amount of force on the peripheral region of the lid 12 in order to fully and securely engage the lid on the container 14

Referring now to FIGS. 1 and 3 in conjunction, the tool 11 of this example has first and second arm members 22 and 23 respectively each of which has a flat first end 24 and 26 respectively. The first ends 24 and 26 are angled towards each other and positioned in adjacent overlaping relationship and are coupled together by a pivot joint 27 oriented to enable handle portions 28 and 29 at the opposite ends of arm members 22 and 23 respectively to swing away from each other and towards each other. The handle portions 28 and 29 are proportioned to be jointly graspable by one hand of an operator of the tool 11.

Referring now to FIGS. 3 and 4 in conjunction, a rotatable drive wheel 31 is journalled to the first arm member 22 at a location between pivot joint 27 and the handle portion 28 of that arm member. Drive wheel 31 is disposed coaxially on a drive shaft 32 which is oriented at right angles to the flat end 24 of first arm member 22 and which extends through a passage 33 in the arm member to connect with a hub 34 adjacent the other side of arm member 22. Means 36 for turning the drive wheel 31 includes, in this embodiment, a cross member 37 at the opposite side of the tool 11 from the drive wheel. Cross member 37 is secured to hub 34, oriented at right angles to the rotational axis of the drive wheel 31 and hub 34 and extends radially in two opposite directions from the hub to enable manual turning of the drive wheel by the other hand of the operator of the tool 11.

A rotatable drum 38 is journalled to the second arm member 23 at the same side of the tool 11 as drive wheel 31 and at a location along the second arm member corresponding to the location of the drive wheel along the first arm member 22. The drum 38 is rotatably supported on the outer end of an axle bolt 39 which extends outwardly from second arm member 23, at right angles to that arm member, through a first annular spacer 41, a relatively thin guide wheel 42, a second annular spacer 43 and finally through the drum, all of which elements are coaxial with the axle bolt. First spacer 41 is secured to the arm member 23 in this embodiment while guide wheel 42, second spacer 43 and drum 38 are formed as a single integral element which is rotatable on the axle bolt 39.

At least the rim 44 of drum 38 has a greater length in the axial direction than the rim 46 of drive wheel 31 and the drum is located further outward from arm members 22 and 23 than the drive wheel. Guide wheel 42 is spaced a smaller distance outward from the drive wheel 31. The relative proportions and placements of these elements will hereinafter be further described in connection with operation of the tool 11 as they are best understood in that context. Also for reasons which will be described in connection with operation of the tool 11, the diameter of the drum 38 progressively increases in the outward direction from arm member 23.

A guide element 47 extends outward from arm member 22 for a distance just slightly greater than the distance that drive wheel 31 extends outward from that arm member in order to assist the operator in maintaining the preferred orientation of the tool 11 during use. Forces may arise during use of the tool 11 that tend to twist the arm members 22, 23 relative to the rotational axis of pivot joint 27 and relative to each other. If unresisted, such forces could accelerate wear at the pivot joint 27 and, if there should be some play or looseness in the pivot joint, such forces could bring about an undesirable misorientation of the arm members 22, 23 and associated elements relative to each other. To prevent such effects, and referring now to FIGS. 3 and 5 in conjunction, an angled bracket 49 secured to the first arm member 22 forms a slot 51 positioned to receive the lower portion of arm member 23 when the arm members 22 and 23 are pivoted towards each other to exert sealing force on a container lid. The bracket 49 then resists any forces that may tend to pry the arm members 22 and 23 apart in directions that are not coincident with the rotational axis of pivot joint 27.

Prior to operation of the tool 11, with reference to FIGS. 1 and 6 in conjunction, the container lid 12 is loosely placed in position at the container opening 16 with the corrugation 21 of the lid being slightly entered into the groove 19 of the container rim 13 to the extent that this can be comfortably accomplished without use of the tool 11. The tool 11 is then brought into operation, initially by positioning the flat ends 24 and 26 of arm members 22, 23 in an essentially tangential relationship to a portion of the container rim 13. The arm members 22 and 23 are then temporarily swung apart about the axis of pivot joint 27 in order to position the rim 46 of drive wheel 31 against the underside of the container rim 13 while the rotatable drum 38 is positioned above the peripheral region of lid 14. Guide element 47 is contacted against the side of the container 14 to assure proper orientation of the tool 11 relative to the container 14.

Handle portions 28 and 29 are then grasped in one hand and brought towards each other to cause drum 38 to exert pressure against the edge of lid 12 and thereby force the adjacent portion of the lid corrugation 21 further into groove 19 of the container rim 13. This also causes the guide wheel 42 to enter the small gap between the outer edge of lid 12 and the outermost portion of the container rim 13.

Successive additional portions of the lid corrugation 21 are then fully seated in groove 19 by manually turning cross member 37. Because of the clamping force which the operator is exerting on handle portions 28 and 29, drive wheel 31 bears forceably against the underside of container rim 13. Rotation of the drive wheel 31 by means of cross member 37 then draws successive portions of the container rim 13 and lid 12 edge under rotatable drum 38 to effect a progressive sealing around the entire rim of the container 14. Typically the container 14 revolves while the tool 11 is held in a more or less fixed position although the container may remain stationary while the tool is itself traveled around the container rim 13 in instances where the container is too heavy to be revolved by operation of the tool Following sealing of the container 14, the tool 11 is easily removed by spreading handle portions 28 and 29 apart sufficiently to disengage guide wheel 42 from the container rim 13.

As may be seem from the foregoing, the guide wheel 42 is located a small distance further outward from arm member 23 than drive wheel 31 and drum 28 is located still further outwardly in order to accomodate to the common form of paint can rim and lid configuration depicted in the drawings. The placement and proportions of such elements may be varied as necessary to accomodate to other container 14 and/or lid 12 configurations.

The progressive increase in diameter of the rotatable drum 38 in the outward direction prevents the force which is being applied to a particular portion of the edge of lid 12 from acting to pry up on a previously seated opposite portion of the edge. As the drum 38 forces an inward portion of the lid 12 edge down slightly further that the adjacent more outward portion of the lid edge, an inverted prying effect is created that acts to reinforce the seated condition at the opposite edge of the lid.

While the invention has been disclosed with respect to a particular embodiment, many variations are possible and it is not intended to limit the invention except as defined in the following claims.

I claim:

1. A tool for seating a lid at the opening of a container wherein the opening is defined by a container rim of greater diameter than the adjacent portion of the container, the lid having a peripheral portion shaped to fit within said container rim and to be frictionally engaged thereby, said tool comprising:

first and second arm members which are pivotably coupled together and which have handle portions proportioned to be jointly grasped by one hand of an operator, a rotatable drive wheel carried by said first arm member in position to bear against the underside of said container rim when said tool is held adjacent said container rim, drive means for enabling rotation of said wheel to bring said drive wheel into contact with successive portions of said underside of said container rim, and a rotatable drum carried on said second arm member in position to exert pressure against said peripheral portion of said lid in cooperation with said drive wheel when said handle portions of said arm members are forced towards each other by said one hand of said operator, said rotatable drum having a greater length in the axial direction than said drive wheel and being shaped and positioned to exert said pressure against said peripheral portion of said lid without penetration thereof and at a location thereon which is spaced inwardly from said container rim.

2. The tool of claim 1 wherein successive portions of said rotatable drum that are progressively further from said second arm member are of progressively increasing diameter.

3. A tool for seating a lid at the opening of a container wherein the opening is defined by a container rim of greater diameter than the adjacent portion of the container, the lid having a peripheral portion shaped to fit within said container rim and to be frictionally engaged thereby, said tool comprising:

first and second arm members which are pivotably coupled together and which have handle portions proportioned to be jointly grasped by one hand of an operator, a rotatable drive wheel carried by said first arm member in position to bear against the underside of said container rim when said tool is held adjacent said container rim, drive means for enabling rotation of said drive wheel to bring said drive wheel into contact with successive portions of said underside of said container rim, an axle shaft extending outwardly from said second arm member at right angles thereto, a rotatable drum carried on said second arm member in position to exert pressure against said peripheral portion of said lid in cooperation with said drive wheel when said handle portions of said arm members are forced towards each other by said one hand of said operator, said rotatable drum having a greater length in the axial direction than said drive wheel, said rotatable drum being disposed on said axle shaft in coaxial relationship therewith and in spaced apart relationship from said second arm member, and a guide wheel disposed on said axle shaft in coaxial relationship therewith between said drum and said first arm member.

4. The tool of claim 3 wherein said guide wheel is located further outwardly from said second arm member than said drive wheel.

5. The tool of claim 3 wherein said guide wheel and said rotatable drum are an integral element having a groove thereon between the guide wheel portion and the drum portion.

6. The tool of claim 3 wherein said guide wheel is situated a predetermined distance further outward from said second arm member than said drive wheel and said rotatable drum is situated a greater predetermined distance outward from said guide wheel.

7. A tool for seating a lid at the opening of a container wherein the opening is defined by a container rim of greater diameter than the adjacent portion of the container, the lid having a peripheral portion shaped to fit within said container rim and to be frictionally engaged thereby, said tool comprising:

first and second arm members which are pivotably coupled together and which have handle portions proportioned to be jointly grasped by one hand of an operator, a pivot joint forming said pivotable coupling of said first and second arm members and defining a pivot axis, a rotatable drive wheel carried by said first arm member in position to bear against the underside of said container rim when said tool is held adjacent said container rim, drive means for enabling rotation of said drive wheel to bring said drive wheel into contact with successive portions of said underside of said container rim, a rotatable drum carried on said second arm member in position to exert pressure against said peripheral portion of said lid in cooperation with said drive wheel when said handle portions of said arm members are forced towards each other by said one hand of said operator, said rotatable drum having a greater length in the axial direction than said drive wheel, and means for resisting movement of said arm members relative to each other when said arm members are pivoted together other than pivoting movement of said arm members about said pivot axis.

8. The tool of claim 1 wherein said rotatable drum has a first portion and a second portion, said first portion of said rotatable drum being further outward from said second arm member than said second portion of said rotatable drum, said first portion of said rotatable drum being of greater diameter than said second portion thereof.

9. A tool for seating a frictionally engagable lid at the opening of a container which has a rim around the opening that is of slightly greater diameter than the adjacent portion of the container, comprising:

first and second arm members having adjacent first ends and having handle portions at the opposite ends, pivot means for coupling the arm members at said first ends thereof while enabling the handle portions to be moved towards each other and away from each other, a rotatable drive wheel journalled to said first arm member between said pivot means and said handle portion thereof and being positioned for contact with the underside of said container rim when said tool is held adjacent said rim, means for manually turning said rotatable drive wheel to bring said drive wheel into contact with successive portions of said underside of said rim, an axle shaft extending sidewardly from said second arm member, a rotatable drum journalled to said second arm member between said pivot means and said handle portion thereof in position to contact the peripheral region of said lid when said drive wheel is in contact with said underside of said rim, said rotatable drum being disposed on said axle shaft in coaxial relationship therewith and in spaced apart relationship from said second arm member, said drum having a length along the axis of rotation thereof that is greater than the length of said drive wheel along the axis of rotation thereof and having a diameter which increases outwardly from said second arm member, and a guide wheel disposed on said axle shaft in coaxial relationship therewith between said arm member and said drum and in spaced apart relationship to each thereof.

10. The tool of claim 9 wherein said guide wheel is located a predetermined distance further outward from said second arm member than said drive wheel and where said rotatable drum is located a greater predetermined distance outwardly from said guide wheel.

* * * * *